(12) United States Patent  (10) Patent No.: US 8,267,214 B2
Arnold  (45) Date of Patent: Sep. 18, 2012

(54) SADDLE-TYPE VEHICLE DRIVETRAIN

(75) Inventor: David W. Arnold, Glendale, CA (US)

(73) Assignee: Honda Motor Company, Ltd., Tokyo (JP)

( * ) Notice: Subject to any disclaimer, the term of this patent is extended or adjusted under 35 U.S.C. 154(b) by 0 days.

(21) Appl. No.: 12/970,412

(22) Filed: Dec. 16, 2010

(65) Prior Publication Data

US 2012/0152636 A1    Jun. 21, 2012

(51) Int. Cl.
*B62D 61/02* (2006.01)
*B62K 11/00* (2006.01)
(52) U.S. Cl. .................. 180/230; 180/219; 180/231
(58) Field of Classification Search .................. 180/219, 180/220, 226, 227, 228, 230, 231
See application file for complete search history.

(56) References Cited

U.S. PATENT DOCUMENTS

| | | | |
|---|---|---|---|
| 4,585,087 A | 4/1986 | Riccitelli | |
| 4,662,471 A | 5/1987 | Kondo et al. | |
| 5,078,416 A | 1/1992 | Keyes | |
| 6,155,125 A | 12/2000 | Negherbon et al. | |
| 6,575,260 B2 | 6/2003 | Bourget | |
| 6,895,915 B2 | 5/2005 | Hemphill | |
| 2007/0119645 A1 | 5/2007 | Michelotti | |
| 2009/0243378 A1* | 10/2009 | Ito et al. | 303/28 |

* cited by examiner

*Primary Examiner* — Lesley D Morris
*Assistant Examiner* — Marc Scharich
(74) *Attorney, Agent, or Firm* — Ulmer & Berne LLP (57) ABSTRACT

A motorcycle is provided that includes a drivetrain. The drivetrain includes a transmission having a transmission output shaft and also includes a gearcase coupled with the transmission output shaft. The gearcase has a gearcase output shaft. The transmission output shaft is rotatable in a first direction and the gearcase output shaft is rotatable in a second direction that is opposite the first direction.

20 Claims, 7 Drawing Sheets

SADDLE-TYPE VEHICLE DRIVETRAIN

TECHNICAL FIELD

A drivetrain for a saddle-type vehicle is provided.

BACKGROUND

Some known motorcycles have a drivetrain that includes a transmission coupled with an engine, and a drive shaft coupled with the transmission and a rear wheel of the motorcycle. The drive shaft, transmission, and rear wheel are coupled with a plurality of bevel gears. Other known motorcycles include a drivetrain having a transmission coupled with an engine, a drive sprocket coupled to an output shaft of the transmission, and a driven sprocket coupled to a rear wheel of the motorcycle. The drive sprocket and driven sprocket are coupled by an endless chain or an endless belt.

SUMMARY

According to one embodiment, a motorcycle includes an engine and a drivetrain coupled with the engine. The drivetrain includes a transmission and a gearcase. The transmission includes a transmission output shaft, which is rotatable in a first direction. The gearcase includes a housing, an input gear, an output gear, and a gearcase output shaft. The housing is removably attached to the transmission. The input gear and the output gear are journalled within the housing. The input gear is coupled with the transmission output shaft for rotation therewith in the first direction and the output gear is coupled with the gearcase output shaft for rotation therewith. The input gear is coupled with the output gear such that each of the output gear and the gearcase output shaft is rotatable in a second direction. The second direction is opposite the first direction.

According to another embodiment, a saddle-type vehicle includes an engine, a rear wheel and a drivetrain coupled with the engine and the rear wheel. The drivetrain is operable for transmitting torque from the engine to the rear wheel. The drivetrain includes a transmission and a gearcase that is removably attached to the transmission. The transmission includes a transmission output shaft that is rotatable in a first direction. The gearcase includes an input gear, an output gear, and a gearcase output shaft. The input gear is releasably coupled with the transmission output shaft, the output gear is coupled with the gearcase output shaft, and the input gear is coupled with the output gear, such that each of the output gear and the gearcase output shaft is rotatable in a second direction. The second direction is opposite the first direction.

According to another embodiment, a motorcycle includes an engine, a rear wheel, a drivetrain, and a lubrication system. The drivetrain is coupled with the engine and the rear wheel, and is operable for transmitting torque from the engine to the rear wheel. The drivetrain includes a transmission and a gearcase coupled with the transmission. The transmission includes a casing that defines an interior cavity and a transmission output shaft that is rotatable in a first direction. The gearcase includes a housing that defines an interior chamber and a gearcase output shaft that is rotatable in a second direction that is opposite the first direction. The housing is removably attached to the casing. The lubrication system is in fluid communication with the interior cavity defined by the casing of the transmission and is in fluid communication with the interior chamber defined by the housing of the gearcase.

BRIEF DESCRIPTION OF THE DRAWINGS

Various embodiments will become better understood with regard to the following description, appended claims and accompanying drawings wherein:

DETAILED DESCRIPTION

Figure 1:
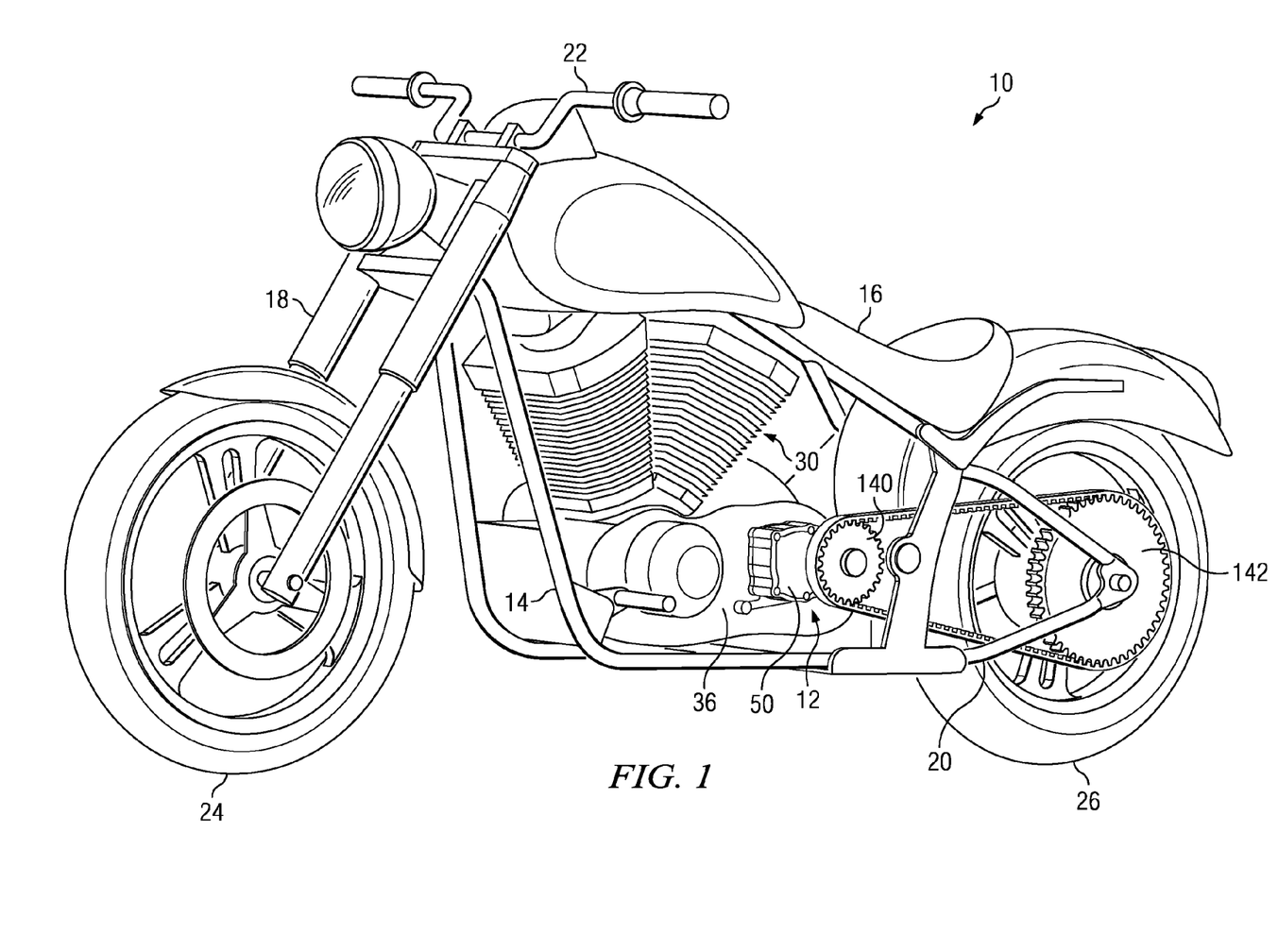
FIG. 1 is a perspective view of a saddle-type vehicle that incorporates a drivetrain according to one embodiment.

Referring to the drawings, wherein like numbers indicate the same or corresponding elements throughout the views, FIG. 1 illustrates a saddle-type vehicle 10 that can include a drivetrain, indicated generally at 12, according to one embodiment. The saddle-type vehicle 10 is shown to be a motorcycle. However, a saddle-type vehicle in accordance with other embodiments can be a scooter. The saddle-type vehicle 10 can also include a frame 14, which is shown to have a generally tubular construction. However, frames can be provided with any other suitable configuration. The saddle-type vehicle 10 can also include one or more seats, such as seat 16, which can be configured to support an operator of the saddle-type vehicle 10. The saddle-type vehicle 10 can also include a fork assembly 18, a swing-arm assembly 20 and a handlebar assembly 22, and each can be associated with the frame 14. The saddle-type vehicle 10 can also include a front wheel 24 that can be rotatably coupled with the fork assembly 18, and can include a rear wheel 26 that can be rotatably coupled with the swing-arm assembly 20. The fork assembly 18 can be pivotally coupled with the frame 14 and the handlebar assembly 22 can be coupled with the fork assembly 18, such that an operator seated upon seat 16 can steer the front wheel 24 with the handlebar assembly 22. The swing-arm assembly 20 can be pivotally coupled with the frame 14 to accommodate movement of the rear wheel 26 when the saddle-type vehicle 10 travels over uneven terrain.

The saddle-type vehicle 10 can also include an engine, indicated generally at 30. Engine 30 can be an internal combustion engine and, as shown in FIG. 1, engine 30 can be a V-twin engine. However, in another embodiment, engines can be provided having any suitable alternative configuration, and in yet other embodiments, other sources of motive power can be provided, such as one or more electric motors. The drivetrain 12 can be coupled with the engine 30 and the rear wheel 26 such that the drivetrain 12 can be operable for transmitting torque from the engine 30 to the rear wheel 26 during operation of the saddle-type vehicle 10.

Figure 4:
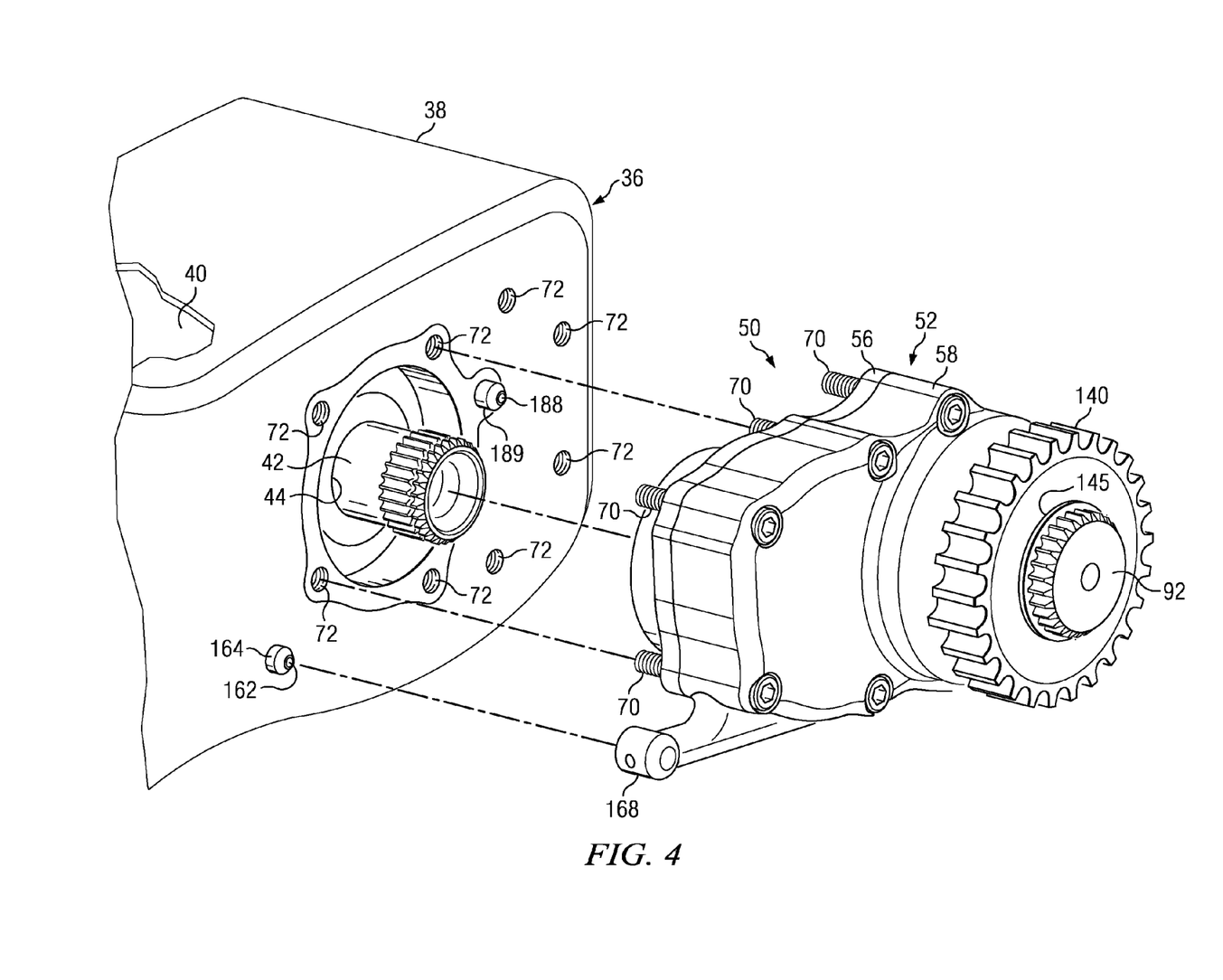
FIG. 4 is an exploded perspective view depicting the gearcase shown in FIGS. 2 and 3 in an assembled configuration, and further depicting a portion of a casing of the transmission of the drivetrain shown in FIG. 1, with a portion of the transmission output shaft depicted in FIGS. 2 and 3 shown to be protruding outwardly from the casing of the transmission.
Figure 7:
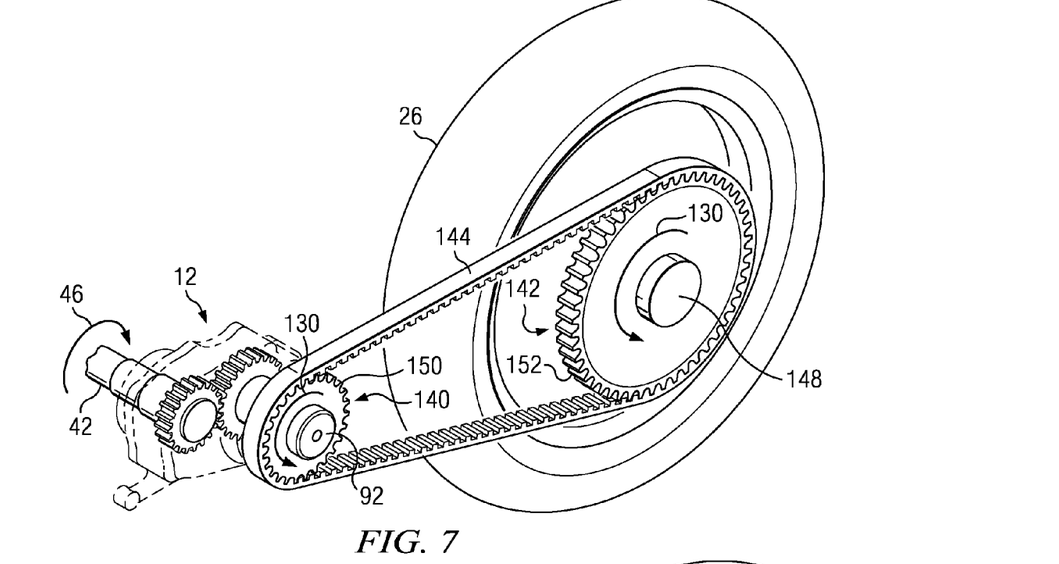
FIG. 7 is a schematic representation of the drivetrain of FIGS. 1-6, according to one embodiment.

The drivetrain 12 can include a transmission 36, which can be coupled with the engine 30. For example, a crankshaft (not shown) of the engine 30 can be coupled with an input shaft (not shown) of the transmission 36. The transmission 36 can include a casing 38, which can define an interior cavity 40 (FIG. 4). Various components of the transmission 36 can be housed within casing 38 in the interior cavity 40. The transmission 36 can also include a transmission output shaft 42 and, as shown in FIG. 4, the transmission output shaft 42 can extend through an opening 44 defined by the casing 38 of the transmission 36, such that a portion of the transmission output shaft 42 can extend outwardly beyond the casing 38. FIG. 7 is a schematic representation of the drivetrain 12, with only the transmission output shaft 42 of the transmission 36 being depicted. As shown in FIG. 7, the output shaft 42 of the transmission 36 can be rotatable in a first direction 46 during operation of the saddle-type vehicle 10.

Figure 3:
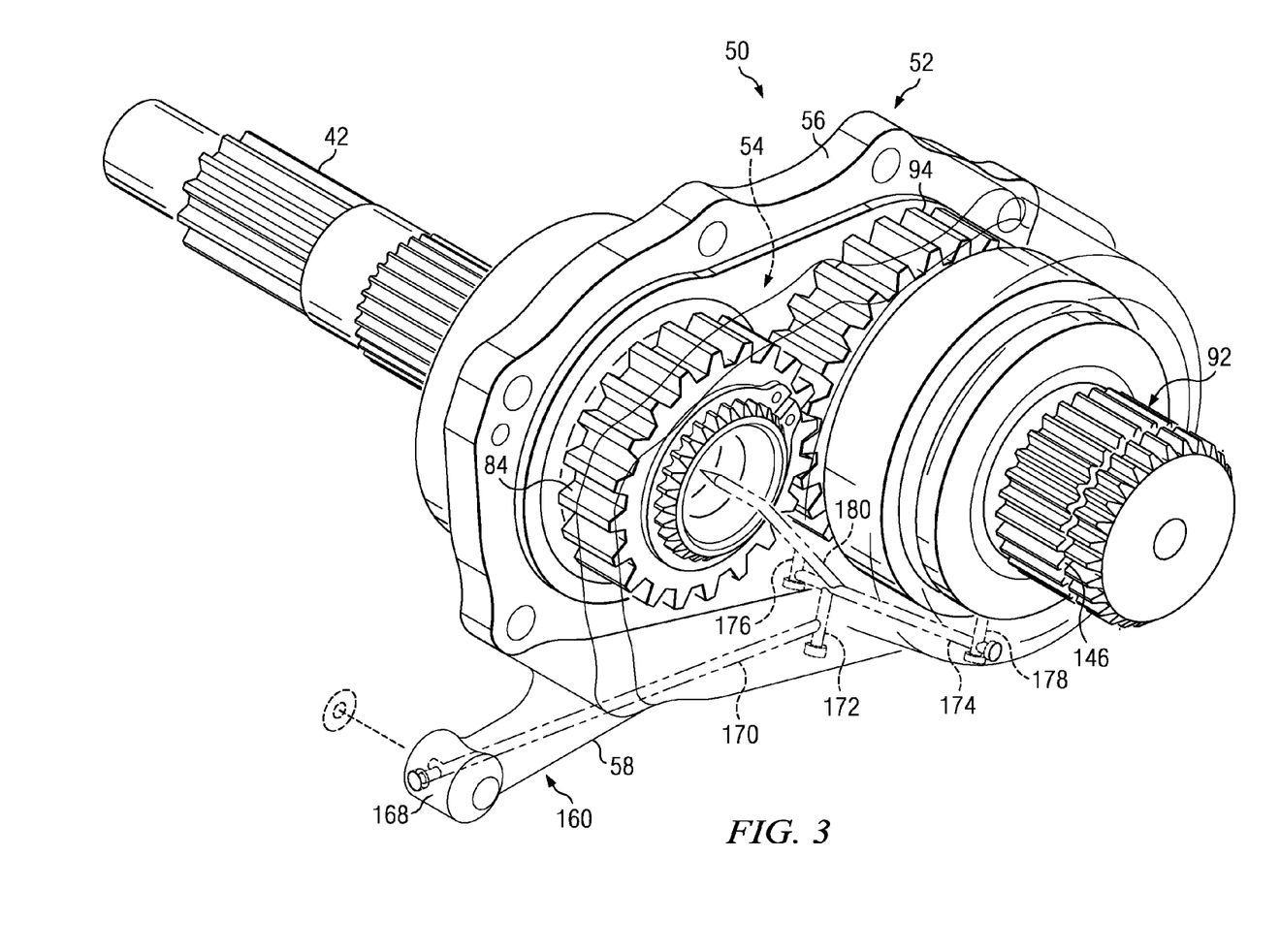
FIG. 3 is a front perspective view of the gearcase, and a portion of the transmission output shaft, shown in FIG. 2.
Figure 5A:
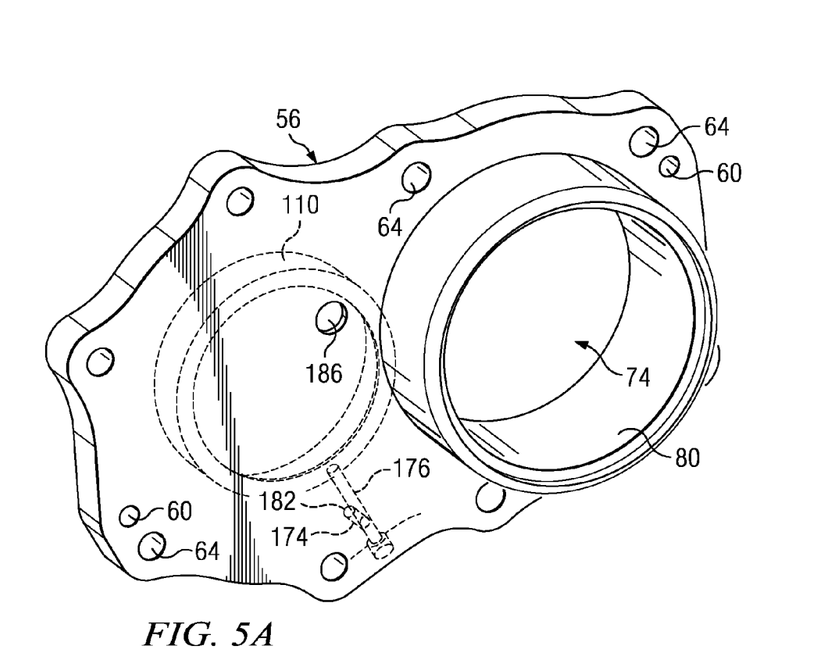
FIG. 5A is a perspective view of a base of a housing of the gearcase shown in FIGS. 1-4.
Figure 6:
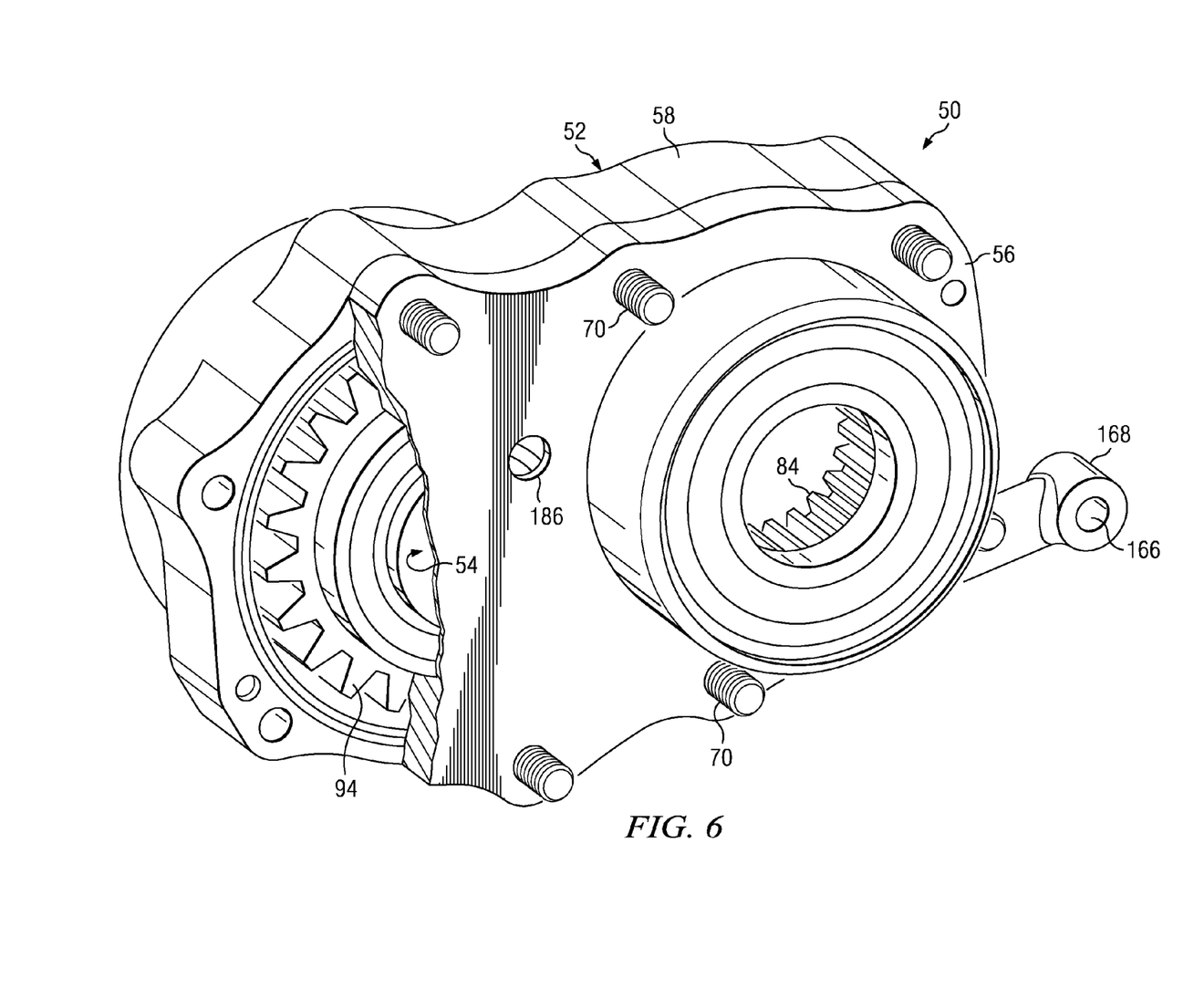
FIG. 6 is a rear perspective view of the gearcase shown in FIGS. 1-4,5A and 5B, with a portion of the base of the housing of the gearcase cutaway for purposes of illustration.

The drivetrain 12 can also include a gearcase 50 which can be removably attached, either directly or indirectly, to the casing 38 of the transmission 36, as subsequently discussed in further detail. The gearcase 50 can include a housing 52 (FIGS. 3, 4 and 6), which can define an interior chamber 54, as shown in FIGS. 3 and 6. The housing 52 can include a base 56 and can further include a cover 58, which can be in contacting engagement with the base 56. In one embodiment, the base 56 and the cover 58 can be attached to one another separately from, and in addition to, the removable attachment of the housing 52 to the casing 38 of the transmission 36. For example, the base 56 can define a plurality of apertures, such as apertures 60 shown in FIG. 5A, and the cover 58 of housing 52 can define a plurality, which can be a like number, of apertures, e.g., apertures 62. Apertures 62 can be aligned with respective ones of the apertures 60 of base 56 such that conventional male fasteners, e.g., bolts (not shown), can pass through the aligned ones of the apertures 60, 62 and can be secured with conventional fasteners such as nuts (not shown). In another embodiment, the apertures 60 and/or the apertures 62 can be threaded to receive conventional male fasteners. In yet another embodiment, the base 56 can be sandwiched, or compressed, between the cover 58 of housing 52 and the casing 38 of transmission 36, when the housing 52 is removably attached to the casing 38. In such an embodiment, the apertures 60, 62 might be omitted from the respective base 56 and cover 58 of the housing 52.

The base 56 of housing 52 can also define a plurality of mount apertures 64, and the cover 58 of housing 52 can define a plurality, which can be a like number, of mount apertures 66 that can be aligned with respective ones of the apertures 64 when the base 56 and cover 58 are positioned in contacting engagement with one another. Accordingly, each of the apertures 64 and an aligned one of the apertures 66 can receive a conventional fastener, such as a threaded bolt 70, which can be used to removably attach the housing 52 to casing 38. More particularly, the bolts 70 can pass through the apertures 64, 66, and can be threaded into respective ones of a plurality of threaded holes 72 defined by the casing 38 of transmission 36, as shown in FIG. 4. The housing 52 can be directly, removably attached to the casing 38 as shown. Alternatively, the housing 52 can be indirectly, removably attached to the casing 38, e.g., in embodiments wherein one or more members such as a gasket, washer, shim, or bracket is interposed between the housing 52 of gearcase 50 and the casing 38 of transmission 36.

Figure 2:
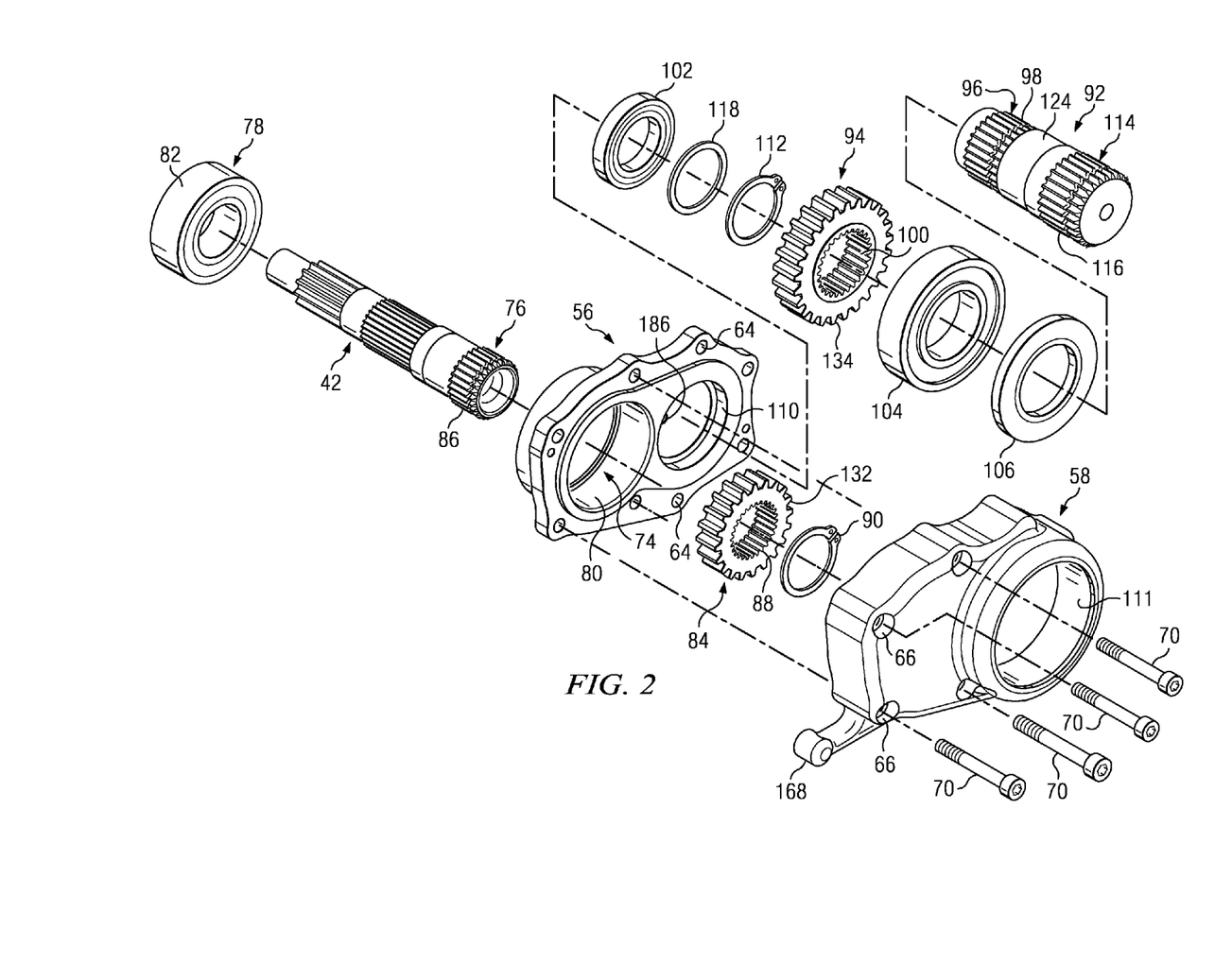
FIG. 2 is an exploded perspective view of a transmission output shaft and a gearcase of the drivetrain of the saddle-type vehicle shown in FIG. 1.

The base 56 of housing 52 can define an opening 74 (FIG. 5A), which can be adjacent the transmission 36, such that a distal end 76 of the output shaft 42 can extend through the opening 74 into the interior chamber 54 defined by housing 52. The transmission output shaft 42 can be journalled within the housing 52. For example, in one embodiment, the gearcase 50 can include a journal bearing 78 (FIG. 2) that can circumscribe the transmission output shaft 42, and can be positioned longitudinally adjacent the distal end 76 of the transmission output shaft 42. The base 56 of housing 52 can include a generally cylindrical interior surface 80, and the journal bearing 78 can include a generally cylindrical outer surface 82. Surfaces 80 and 82 can be sized such that they are in contacting engagement with one another. The distal end 76 of the transmission output shaft 42 can extend beyond base 56 and into a portion of the interior chamber 54 that is defined by the cover 58 of housing 52. The gearcase 50 can also include an input gear 84, which can be releasably coupled to the transmission output shaft 42. As shown in FIG. 3, the input gear 84 can be splined to the distal end 76 of the transmission output shaft 42. Accordingly, the input gear 84 is rotatable with the transmission output shaft 42 in the first direction 46. As shown in FIG. 2, the distal end 76 of the transmission output shaft 42 can include splines 86 and the input gear 84 can include mating splines 88. The input gear 84 can circumscribe the distal end 76 of the transmission output shaft 42 with splines 88 engaged with splines 86, such that the input gear 84 is releasably coupled with the transmission output shaft 42. A retaining ring 90, which can be a circlip, can be secured to the distal end 76 of the transmission output shaft 42 adjacent the input gear 84 to inhibit inadvertent disengagement of the input gear 84 from the distal end 76 of the transmission output shaft 42.

The gearcase 50 can also include a gearcase output shaft 92 and an output gear 94 that can be coupled to the gearcase output shaft 92. Referring to FIG. 2, the output gear 94 can be splined to the gearcase output shaft 92. An inner end 96 of the gearcase output shaft 92 is shown to include splines 98 and the output gear 94 can include mating splines 100. The output gear 94 can circumscribe the gearcase output shaft 92, with splines 100 engaged with splines 98, such that the output gear 94 is coupled with the gearcase output shaft 92 for rotation therewith. In another embodiment, the output gear 94 can be press fit onto the gearcase output shaft 92. In yet another embodiment, the output gear 94 can be formed with the gearcase output shaft 92 as a one-piece construction.

Referring to FIG. 2, the gearcase output shaft 92 can be journalled within housing 52 using one or more journal bearings, e.g., journal bearings 102 and 104. The gearcase 50 can also include a thrust bearing 106 that can interface with the gearcase output shaft 92. The base 56 of housing 52 can include a generally cylindrical inner surface 110, which can engage an outer surface of the journal bearing 102, and the cover 58 of housing 52 can include a generally cylindrical interior surface 111, which can engage an outer surface of the journal bearing 104. A retaining ring 112, which can be a circlip, can be secured to the gearcase output shaft 92 and can be positioned longitudinally to at least inhibit movement of the output gear 94 toward an outer end 114 of the gearcase output shaft 92. The outer end 114 of the gearcase output shaft 92 is shown to include splines 116. A spacer, or washer 118 can be positioned longitudinally intermediate the splines 98 and the journal bearing 102 to prevent contact between splines 98 and journal bearing 102. The journal bearing 104 can circumscribe a generally central portion 124 of the gearcase output shaft 92, which is longitudinally intermediate the inner end 96 and the outer end 114 of the gearcase output shaft 92. The thrust bearing 106 can circumscribe the gearcase output shaft 92 at a location that is generally between the central portion 124 and the outer end 114. The thrust bearing 106 can accordingly be interposed between the cover 58 of the housing 52 and the journal bearing 104.

The input gear 84 of the gearcase 50 can be coupled with the output gear 94 of the gearcase 50 such that the output gear 94 is rotatable with the gearcase output shaft 92 in a second direction 130, which is shown in FIG. 7 to be opposite the first direction 46. The input gear 84 of gearcase 50 can mesh with the output gear 94 of the gearcase 50. More particularly, teeth 132 of the input gear 84 can mesh with teeth 134 of the output gear 94.

The drivetrain 12 can also include a drive member 140, a driven member 142, and a flexible drive member 144, as shown in FIG. 7. The drive member 140 can be coupled with the gearcase output shaft 92. The drive member 140 can circumscribe the outer end 114 of the gearcase output shaft 92, and can include splines (not shown) that engage, and mate with, the splines 116 of the outer end 114 of the gearcase output shaft 92. A retaining ring 145 (FIG. 4) can engage the gearcase output shaft 92 and can be positioned longitudinally adjacent the drive member 140, e.g., within a groove 146 (FIG. 3) defined by the outer end 114 of the gearcase output shaft 92, to prevent inadvertent disengagement of the drive member 140 from the gearcase output shaft 92.

The driven member 142 can be coupled with both the drive member 140 and the rear wheel 26, such that the driven member 142 and the rear wheel 26 are rotatable in the second direction 130 (FIG. 7). The driven member 142 can be rotatably coupled with the rear wheel 26 in any suitable manner. In one embodiment, the driven member 142 can be coupled with a rear axle 148, in any suitable manner, and the rear axle 148 can be coupled with the rear wheel 26, in any suitable manner, such that each of the driven member 142, the rear axle 148, and the rear wheel 26, is rotatable in the second direction 130. Each of the drive member 140 and the driven member 142 can be a sprocket, and can include teeth 150,152, respectively. The flexible drive member 144 is shown to be an endless cogged belt, which wraps partially around each of the drive member 140 and the driven member 142, engages the teeth 150 of the drive member 140 and the teeth 152 of the driven member 142, and extends between the drive member 140 and the driven member 142. Alternatively, the flexible drive member 144 can be a chain, depending upon the particular configurations of the teeth 150, 152.

The saddle-type vehicle 10 can also include a lubrication system, indicated generally at 160 in FIG. 3, which can be operable for circulating a lubrication fluid within each of, and between, the transmission 36 and the gearcase 50. The lubrication system 160 can be in fluid communication with the interior cavity 40 defined by the casing 38 of transmission 36, and can also be in fluid communication with the interior chamber 54 defined by the housing 52 of gearcase 50. The lubrication system 160 can be configured to operably lubricate various components of transmission 36 and gearcase 50.

The lubrication system 160 can include a pump (not shown), which can be positioned within the interior cavity 40 defined by the casing 38 of transmission 36. A lubricating fluid (not shown) within the interior cavity 40 can lubricate various components of transmission 36 that are positioned, at least partially, within the interior cavity 40. The pump can operably pump lubrication fluid out of the interior cavity 40 through an outlet 162 (FIG. 4) that can be defined by an outlet port 164 provided on the casing 38 of transmission 36, to an inlet 166 (FIG. 6) of gearcase 50, which can be defined by an inlet port 168 of housing 52 of gearcase 50. The outlet port 164 of casing 38 can engage the inlet port 168 of housing 52 such that the outlet 162 and the inlet 166 can be in fluid communication and the ports 164 and 168 can be at least substantially sealed together to at least substantially prevent leakage.

Figure 5B:
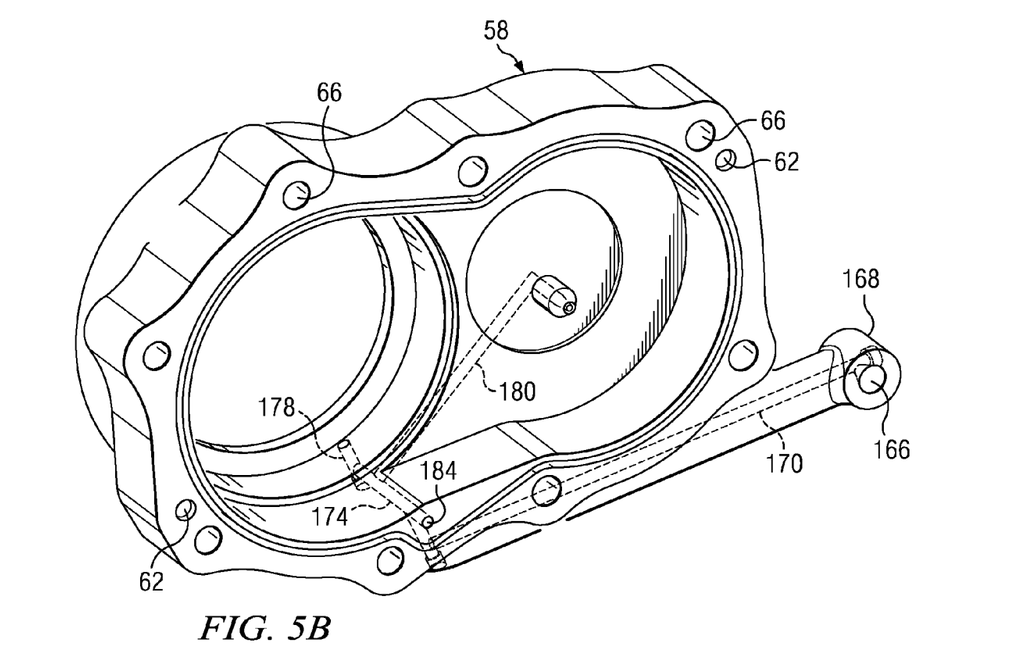
FIG. 5B is a perspective view of a cover of the housing of the gearcase shown in FIGS. 1-4.

The inlet 166 can also be in fluid communication, via one or more passages, with the interior chamber 54 defined by the housing 52 of gearcase 50. In particular, the lubrication system 160 can also include a plurality of passages that can be defined by the housing 52 of gearcase 50. For example, as illustrated in FIGS. 3, 5A and 5B, the lubrication system 160 can include a passage 170 that can be in fluid communication with the inlet 166 and can also be in fluid communication with a passage 172, which in turn can be in fluid communication with a passage 174. The passage 170 can be defined by the cover 58 of the housing 52. The passage 174 can also be in fluid communication with one or more additional passages, such as passages 176, 178 and 180. The passage 176 can operably direct lubricating fluid toward the output gear 94 of gearcase 50. The passage 178 can operably direct lubricating fluid toward the journal bearing 104 and/or the thrust bearing 106, which can be positioned longitudinally adjacent one another. Passage 180 can operably direct lubricating fluid onto the transmission output shaft 42. As illustrated in FIG. 5A, the passage 176 can be defined by the base 56. It will therefore be appreciated that certain portions of the passage 174 can be defined by either of the base 56 and the cover 58, as illustrated in FIGS. 3, 5A and 5B. Therefore, the base 56 and the cover 58 can define respective orifices 182, 184 that permit lubricating fluid to pass between the portions of the passage 174 (e.g., between the base 56 and the cover 58).

The interior chamber 54 of the housing 52 of the gearcase 50 can be in fluid communication with the interior cavity 40 defined by the casing 38 of the transmission 36 such that lubricating fluid from the passages 170, 172, 174, 176, 178, and 180 can return to the interior cavity 40 of the transmission 36. For example, as illustrated in FIGS. 5A and 6, the base 56 of the can define an aperture 186 and the casing 38 of the transmission 36 can define an outlet 188 defined by a return port 189 (FIG. 4). When the housing 52 is attached to the casing 38 of the transmission 36, the aperture 186 and the outlet 188 can be in fluid communication, with the return port 189 being at least substantially sealed with the housing 52 to at least substantially prevent leakage.

One or more of the passages 170, 172, 174, 176, 178 and 180 can be formed as a bore in housing 52, and can include a plug at one end of the respective passage. It will be appreciated that lubrication systems can be provided with more or less passages than the passages included in lubrication system 160, and can have any of a variety of suitable alternative configurations. Furthermore, such passages can be formed in any suitable manner, which can include machining, casting, and molding, e.g., depending upon the particular material used to manufacture housing 52 and casing 38.

Drivetrains of saddle-type vehicles, such as motorcycles and scooters, can be configured to include either a "chain driven" rear wheel, or a "shaft driven" rear wheel, depending on the particular application and desired characteristics. For example, "shaft driven" configurations can be more durable, but may be considered by some users to be aesthetically less pleasing. Also, "shaft driven" configurations may be less conducive than "chain drive" configurations to aftermarket wheel customization. In addition, "shaft driven" configurations can be susceptible to undesirable mechanical losses and can cause the saddle-type vehicle to experience anti-squat during operation. Conventional drivetrains that include "chain driven" rear wheels can include a transmission output shaft that rotates in the same direction as the rear axle and rear wheel. In contrast, conventional drivetrains that include "shaft driven" rear wheels can include a transmission output shaft that rotates in an opposite direction as the rear wheel, due to the use of bevel gears to couple the drive shaft with the transmission and the rear wheel. The transmission output shaft of conventional drivetrains configured for a "shaft driven" rear wheel can include a bevel gear formed on a distal end of the transmission output shaft, with the transmission output shaft being a unitary construction. The bevel gear of the transmission output shaft engages a bevel gear integral with one end of the drive shaft. Accordingly, it can be very difficult to convert the drivetrain of a saddle-type vehicle, such as a motorcycle, from a "shaft driven" rear wheel configuration to a "chain driven" rear wheel configuration, or vice versa, due to the necessity to change or substantially overhaul the transmission, or change the configuration of the engine of the motorcycle, in order to select the direction of rotation of the transmission output shaft.

Figure 8:
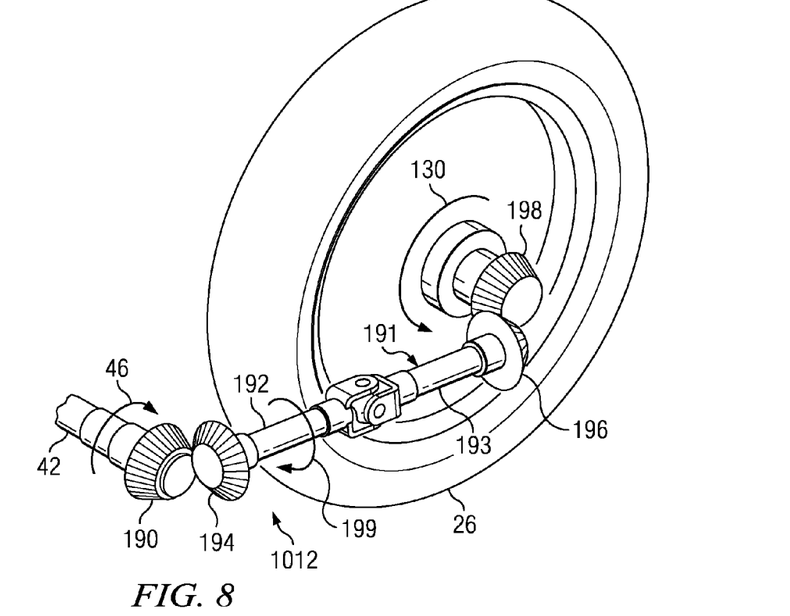
FIG. 8 is a schematic representation of a drivetrain of a saddle-type vehicle having a shaft-driven rear wheel configuration.

The gearcase 50 and the configuration of the transmission output shaft 42, facilitate a relatively simple conversion from a "shaft driven" rear wheel configuration to a "chain driven" rear wheel configuration, or vice versa, by eliminating the need to change or substantially overhaul the transmission, or change the configuration of the engine. These conversions can be illustrated by comparing the drivetrain 12 shown schematically in FIG. 7 to a drivetrain 1012 shown schematically in FIG. 8. The drivetrain 1012 is shown to be coupled with the rear wheel 26 and to include transmission 36 (only the transmission output shaft 42 is shown in FIG. 8). However, unlike drivetrain 12, the drivetrain 1012 does not include the gearcase 50. Also, drivetrain 1012 can include a first bevel gear 190 that can releasably engage the splines 86 (not shown in FIG. 8) on the distal end 76 of the transmission output shaft 42. Drivetrain 1012 can also include a drive shaft 191, which can include a forward shaft 192 and a rearward shaft 193 that can be coupled with a universal joint as shown. Drivetrain 1012 can also include second, third and fourth bevel gears 194, 196, and 198, respectively. The second bevel gear 194 can be secured to the forward shaft 192 and can mesh with the first bevel gear 190. The third bevel gear 196 can be secured to the rearward shaft 193 and can mesh with the fourth bevel gear 198, which can be secured to the rear wheel 26. The transmission output shaft 42 rotates in the first direction 46 as discussed previously. Due to the use of the bevel gears 190, 194, 196, and 198, the drive shaft 191 rotates in a third direction 199, and the rear wheel 26 rotates in the second direction 130, which is opposite the first direction 46 and which produces forward movement of the saddle-type vehicle 10.

Conversion from drivetrain 1012 to drivetrain 12 can be achieved relatively easily. After removing drive shaft 191, bevel gear 190 can be removed from the transmission output shaft 42 and can be replaced with the input gear 84 of gearcase 50, the bevel gear 198 can be replaced with the driven member 142, and the drive member 140 can be coupled with the gearcase output shaft 92 and the driven member 142, as shown schematically in FIG. 7. Conversion from drivetrain 12 to drivetrain 1012 can also be achieved relatively easily by reversing the foregoing steps. Conversion from drivetrain 1012 to drivetrain 12, or vice versa, can require removal and replacement of the respective swing-arm assembly, but this can be less costly than substantially overhauling or replacing the respective transmission, or changing the configuration of the respective engine, and can permit a user to select among a variety of different swing-arm assembly arrangements (e.g., to achieve certain performance or aesthetics).

It will be appreciated, that conversion between drivetrain 1012 and drivetrain 12 might require the transmission output shaft 42 to be removed from the transmission 36 to facilitate installation of the journal bearing 78 onto the transmission output shaft 42 and into engagement with the generally cylindrical interior surface 80 of the base 56 of housing 52. In an alternative embodiment, the distal end 76 of the transmission output shaft 42 can be configured to allow the journal bearing 78 to pass over the distal end 76 for installation onto the transmission output shaft 42, such that removal of the transmission output shaft 42 might not be required.

While various embodiments of a motorcycle have been illustrated by the foregoing description and have been described in considerable detail, it is not intended to restrict or in any way limit the scope of the appended claims to such detail. Additional modifications will be readily apparent to those skilled in the art.

What is claimed is:

1. A motorcycle comprising:
an engine; and
a drivetrain coupled with the engine; wherein
the drivetrain comprises a transmission and a gearcase;
the transmission comprises a transmission output shaft, the transmission output shaft being rotatable in a first direction;
the gearcase comprises a housing, an input gear, an output gear, and a gearcase output shaft, the input gear and the output gear being journalled within the housing, the housing being removably attached to the transmission;
the input gear is coupled with the transmission output shaft for rotation therewith in the first direction and the output gear is coupled with the gearcase output shaft for rotation therewith; and
the input gear is coupled with the output gear such that each of the output gear and the gearcase output shaft is rotatable in a second direction, the second direction being opposite the first direction.

2. The motorcycle of claim 1, further comprising:
a rear wheel; wherein
the drivetrain further comprises a drive member and a driven member;
the drive member is coupled with the gearcase output shaft such that the drive member is rotatable in the second direction; and
the driven member is coupled with the drive member and with the rear wheel, such that the driven member and the rear wheel are rotatable in the second direction.

3. The motorcycle of claim 2, further comprising:
a flexible drive member; wherein
the flexible drive member couples the drive member and the driven member.

4. The motorcycle of claim 3, wherein:
the input gear is splined to the transmission output shaft;
the output gear is splined to the gearcase output shaft; and
the input gear is meshed with the output gear.

5. The motorcycle of claim 2, wherein:
each of the drive member and the driven member comprises a sprocket.

6. The motorcycle of claim 2, wherein:
the transmission further comprises a casing and the housing of the gearcase is removably attached to the casing of the transmission.

7. The motorcycle of claim 5, further comprising:
a lubrication system configured to circulate a lubricating fluid; wherein
the housing of the gearcase defines an interior chamber;

the transmission further comprises a casing that defines an interior cavity; and the lubrication system is in fluid communication with the interior chamber defined by the housing of the gearcase and with the interior cavity defined by the casing of the transmission.

8. The motorcycle of claim 7, wherein:

the lubrication system comprises a plurality of passages formed in the housing of the gearcase; and at least one of the passages operably directs the lubricating fluid toward the output gear of the gearcase.

9. The motorcycle of claim 8, wherein:

the gearcase further comprises a first journal bearing receiving the gearcase output shaft and a thrust bearing interfacing with the gearcase output shaft and positioned adjacent the first journal bearing; and at least another one of the passages operably directs the lubricating fluid toward the first journal bearing and the thrust bearing.

10. A saddle-type vehicle comprising:

an engine;

a rear wheel; and a drivetrain coupled with the engine and with the rear wheel, the drivetrain being operable for transmitting torque from the engine to the rear wheel; wherein the drivetrain comprises a transmission and a gearcase, the gearcase being removably attached to the transmission;

the transmission comprises a transmission output shaft, the transmission output shaft being rotatable in a first direction;

the gearcase comprises an input gear, an output gear, and a gearcase output shaft; and the input gear is releasably coupled with the transmission output shaft for rotation therewith in the first direction, the output gear is coupled with the gearcase output shaft, and the input gear is coupled with the output gear: such that each of the output gear and the gearcase output shaft is rotatable in a second direction, the second direction being opposite the first direction.

11. The saddle-type vehicle of claim 10, wherein:

the drivetrain further comprises a drive member and a driven member;

the drive member is coupled with the gearcase output shaft such that the drive member is rotatable in the second direction; and the driven member is coupled with the drive member and with the rear wheel such that the driven member and the rear wheel are rotatable in the second direction.

12. The saddle-type vehicle of claim 10, wherein:

the gearcase further comprises a housing; and the input gear and the output gear are journalled within the housing.

13. The saddle-type vehicle of claim 12, further comprising:

a lubrication system; wherein the housing of the gearcase defines an interior chamber;

the transmission further comprises a casing, the casing defining an interior cavity, the housing being removably attached to the casing; and the lubrication system is in fluid communication with the interior chamber defined by the housing of the gearcase and with the interior cavity defined by the casing of the transmission.

14. A motorcycle comprising:

an engine;

a rear wheel; and a drivetrain coupled with the engine and the rear wheel, the drivetrain being operable for transmitting torque from the engine to the rear wheel; wherein the drivetrain comprises a transmission and a gearcase coupled with the transmission;

the transmission comprises a casing and a transmission output shaft, the casing defining an interior cavity, the transmission output shaft being rotatable in a first direction;

the gearcase comprises a housing and a gearcase output shaft, the housing defining an interior chamber and being removably attached to the casing, the gearcase output shaft being rotatable in a second direction, the second direction being opposite the first direction; and the motorcycle further comprises a lubrication system, the lubrication system being in fluid communication with the interior cavity defined by the casing of the transmission and in fluid communication with the interior chamber defined by the housing of the gearcase.

15. The motorcycle of claim 14, wherein:

the gearcase of the drivetrain further comprises an input gear and an output gear;

the input gear is coupled with the transmission output shaft for rotation therewith in the first direction and the output gear is coupled with the gearcase output shaft for rotation therewith;

the input gear is coupled with the output gear such that each of the output gear and the gearcase output shaft is rotatable in the second direction;

the lubrication system comprises a plurality of passages formed in the housing of the gearcase; and at least one of the passages operably directs a lubricating fluid toward the output gear of the gearcase.

16. The motorcycle of claim 15, wherein:

the gearcase further comprises a first journal bearing which receives the gearcase output shaft, and a thrust bearing interfacing with the gearcase output shaft and positioned adjacent the first journal bearing; and at least another one of the passages operably directs the lubricating fluid toward the first journal bearing and the thrust bearing.

17. The motorcycle of claim 16, wherein:

at least some of the passages comprise a bore formed in the housing of the gearcase.

18. The motorcycle of claim 16, wherein:

the gearcase further comprises a second journal bearing which receives the transmission output shaft;

the lubrication system operably directs the lubricating fluid toward the second journal bearing.

19. The motorcycle of claim 16, wherein:

the drivetrain further comprises a drive member and a driven member;

the drive member is coupled with the gearcase output shaft such that the drive member is rotatable in the second direction; and the driven member is coupled with the drive member and with the rear wheel, such that the driven member and the rear wheel are rotatable in the second direction.

20. The motorcycle of claim 15, wherein the housing of the gearcase comprises a base and a cover, and at least one of the passages is partially defined by each of the base and the cover.

* * * * *

UNITED STATES PATENT AND TRADEMARK OFFICE
CERTIFICATE OF CORRECTION

| | | |
|---|---|---|
| PATENT NO. | : 8,267,214 B2 | Page 1 of 1 |
| APPLICATION NO. | : 12/970412 | |
| DATED | : September 18, 2012 | |
| INVENTOR(S) | : David W. Arnold | |

It is certified that error appears in the above-identified patent and that said Letters Patent is hereby corrected as shown below:

Claim 10, Column 9, Line 36, change "gear:" to --gear,--.

Signed and Sealed this
Thirtieth Day of October, 2012

David J. Kappos
*Director of the United States Patent and Trademark Office*